United States Patent

Weaver et al.

[11] Patent Number: 5,922,110
[45] Date of Patent: Jul. 13, 1999

[54] WATER-SOLUBLE, BIODEGRADABLE FILTER, AND PROCESS OF USING SAME

[75] Inventors: Harvey L. Weaver, Wilmington, Del.; Donald Mark Cyron, New London Township, Pa.

[73] Assignee: DCV, Inc., Wilmington, Del.

[21] Appl. No.: 09/010,526

[22] Filed: Jan. 21, 1998

[51] Int. Cl.$^6$ ............................................. B01D 46/00
[52] U.S. Cl. ............................. 95/273; 55/421; 55/522; 55/528
[58] Field of Search ................... 55/522, 528, 421; 95/273

[56] References Cited

U.S. PATENT DOCUMENTS

| | | | |
|---|---|---|---|
| 3,616,603 | 11/1971 | Warner | 55/522 |
| 5,095,054 | 3/1992 | Lay et al. | 524/47 |
| 5,308,663 | 5/1994 | Nakagawa et al. | 210/507 |
| 5,478,386 | 12/1995 | Itoh et al. | 106/169 |
| 5,702,516 | 12/1997 | Spangler | 55/522 |
| 5,783,505 | 7/1998 | Duckett et al. | 442/411 |
| 5,817,159 | 10/1998 | Cahill et al. | 55/528 |

FOREIGN PATENT DOCUMENTS 0 609 284 B1  10/1992  European Pat. Off. .

*Primary Examiner*—Duane S. Smith
*Attorney, Agent, or Firm*—Basil S. Krikelis

[57] ABSTRACT

A water-soluble, biodegradable filter medium for removing entrained solid and/or liquid particles from an air stream, and a method of use thereof are disclosed. The filter medium is a solid solution of starch and a biodegradable, water-soluble synthetic polymer. After use, the filter medium is disposed of in an environmentally sound fashion. In particular, the filter medium is dissolved in water and the solid and/or liquid particles collected thereon are removed from the resulting aqueous solution of starch and polymer by decantation and the polymer and starch biodegraded using a conventional biological water treatment process.

20 Claims, 2 Drawing Sheets

WATER-SOLUBLE, BIODEGRADABLE FILTER, AND PROCESS OF USING SAME

FIELD OF THE INVENTION

The present invention relates to a water-soluble, biodegradable filter medium, and method using the same, adapted to remove water-insoluble solid and liquid particles (particulates) from the air passing through a painting station or booth. The filter medium is made from a blend of starch and a biodegradable, water-soluble synthetic polymer.

BACKGROUND OF THE INVENTION

In the past, biodegradable filter media comprising a water-soluble component have been used to form cigarette filters. Such filters generally comprise cellulose acetate fibers and a biodegradable, water-soluble additive. Preferably the additives are starch, starch derivatives, or dextrins. Such filters are disclosed in European Patent No. 609284 (World Patent No. 9307771).

Blends of destructurized ("gelatinized") starches and various synthetic polymers are disclosed in U.S. Pat. No. 5,095,054.

SUMMARY OF THE INVENTION

The invention is based on the inventor's discovery that airborne water-insoluble solid and liquid particles can be impinged and retained by a water-soluble, biodegradable filter and thereafter separated from the filter in an environmentally sound fashion.

In particular, the invention is directed to a method for separating liquid and/or solid water-insoluble particles entrained in a flowing stream of gas by impinging and retaining those particles on the surface of a solid filter medium, the method comprising:

(a) utilizing as a material for the filter medium a composition comprising a solid solution of a starch and a biodegradable, water-soluble synthetic polymer;

(b) placing the filter medium in water maintained at a temperature above the solubility temperature of the synthetic polymer to effect formation of a liquid aqueous solution of the biodegradable polymer and the starch;

(c) separating the water-insoluble components of the retained particles from the aqueous solution.

In addition, the invention is directed to a filter medium adapted to impinge and retain liquid and/or solid water-insoluble particles entrained in a flowing stream of gas, the filter medium comprising a solid solution of a starch and a biodegradable, water-soluble synthetic polymer.

DETAILED DESCRIPTION OF THE DRAWINGS

Figure 1:
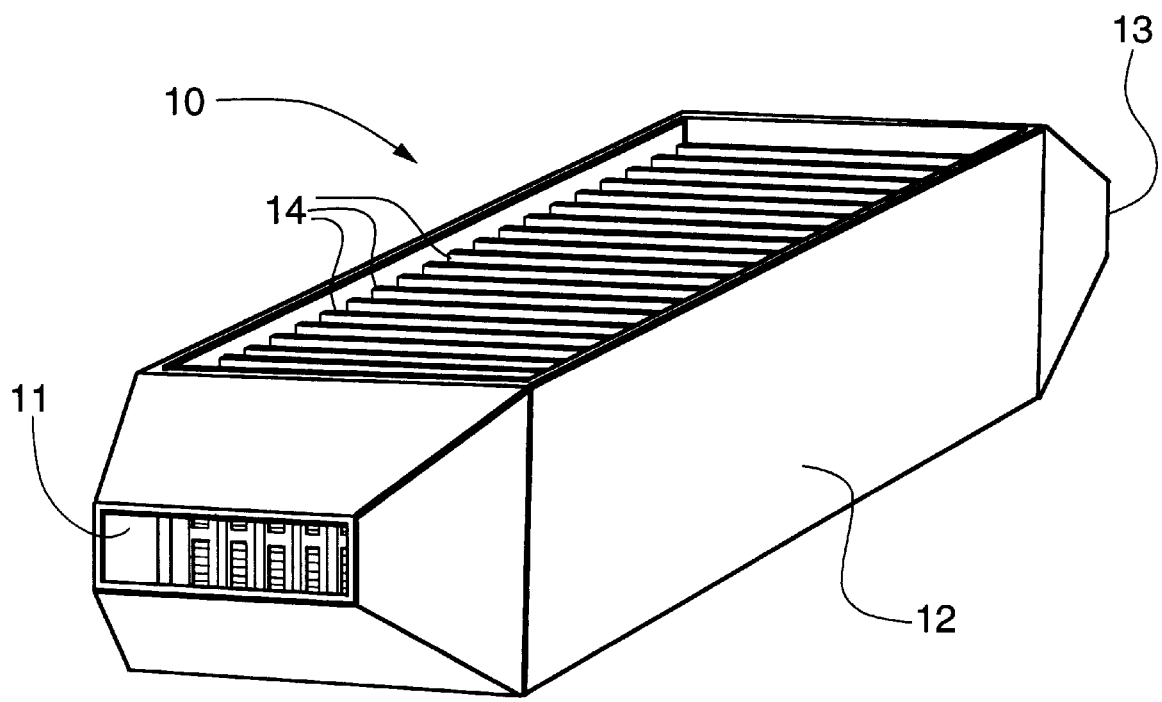
FIG. 1 is a perspective view of a conventional tortuous path air filter, as used in one embodiment of the present invention.

Referring now to FIG. 1, a filter assembly 10 is provided with an inlet 11, a filter element holding plenum 12 and a gas exit 13. Contained in filter element holding plenum 12 are a plurality of filter elements 14, which are exposed to view by removal of the top of filter element holding plenum 12.

Figure 2:
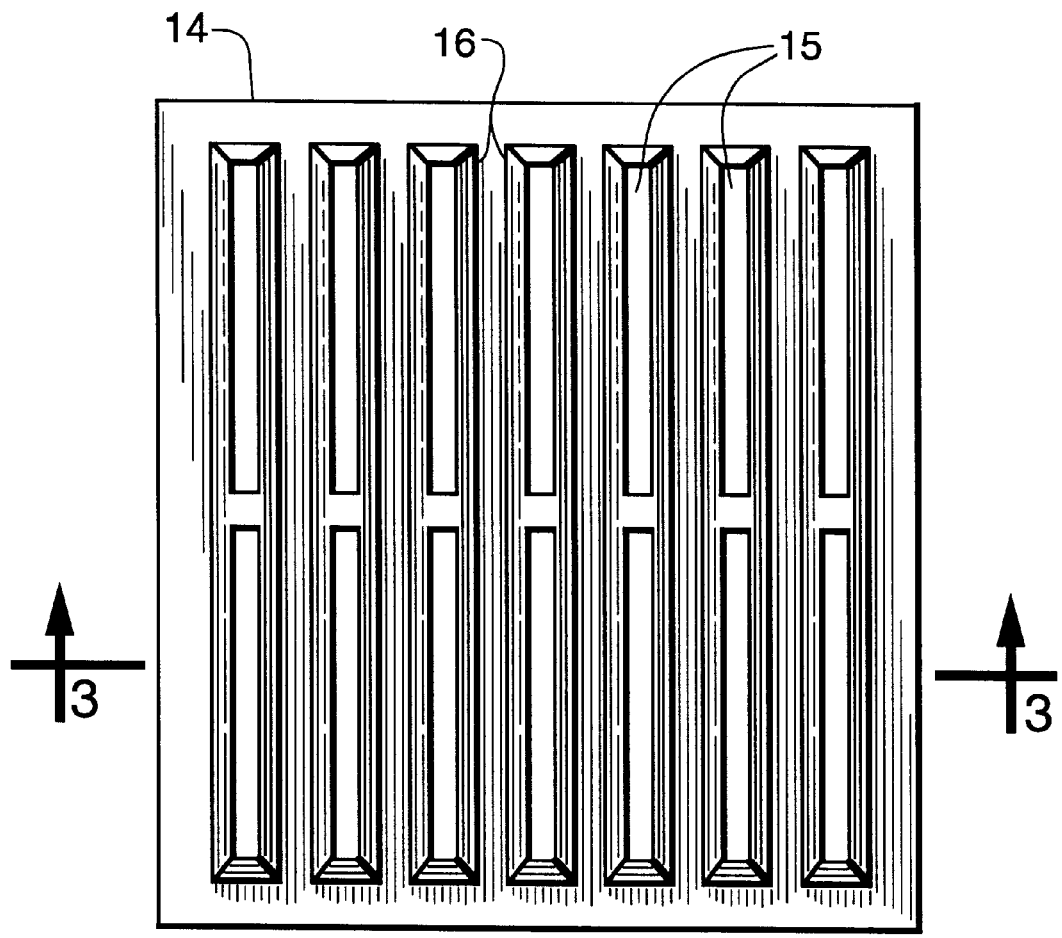
FIG. 2 is a plan view of one of the shaped, porous, sheet-like filter members in one embodiment of the present invention.
Figure 3:
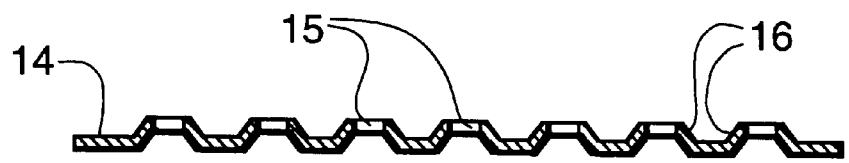
FIG. 3 is a cross-sectional view taken on line 3—3 of FIG. 2.

Referring now to FIG. 2, a filter element 14 is depicted as having a plurality of slit-like openings 15 in protrusions 16. Referring now to FIG. 3, a cross-section of a filter element 14 is depicted showing openings 15 in protrusions 16.

DETAILED DESCRIPTION

The present invention provides a method for separating liquid and/or solid water-insoluble particles (particulates) entrained in a flowing stream of gas by retaining those particles on the surface of a biodegradable filter medium. The filter medium preferably comprises a composition comprising starch and a biodegradable, water-soluble synthetic polymer.

The synthetic polymer preferably comprises poly(vinyl alcohol). Normally, the poly(vinyl alcohol) has a number average molecular weight of 10,000 to 250,000 and preferably from 15,000 to 150,000. Normally poly(vinyl alcohol) is prepared by hydrolyzing the acetate groups off of polyvinyl acetate. Generally the poly(vinyl alcohol)s suitable for use herein contain 0 to 25% residual acetate groups with 75 to 100% of the acetate groups having been hydrolyzed to alcohol groups (degree of hydrolysis).

Starches suitable for use herein are water-soluble starches derived from any of a wide variety of agricultural products. Suitable starches include, but are not limited to, wheat starch, corn starch, potato starch, etc. Various modified starches are also suitable for use herein. Such modified starches are melt-fabricable and at least 95 wt. % soluble in water at 20° C. The preferred starches for use herein are starches which have first been "destructurized" or "gelatinized". Suitable destructurized starches are disclosed in U.S. Pat. No. 5,095,054.

Destructurization or gelatinization is accomplished by heating raw starch granules in the presence of water. Treatment produces a disordering of the starch granules and allows the starch to be more effectively blended in conventional processing and production steps. Suitable starches can also be obtained by using chemical derivatives of starch, such as oxidized starch, starch monophosphate, starch diphosphate, starch acetate, starch sulfate, starch hydroxyethylether, carboxymethyl starch, starch ether, 2-hydroxypropyl starch, alphatized starch, starch xanthide, starch chloroacetic acid, starch ester, formaldehyde starch, sodium carboxymethyl starch and mixtures thereof. Also suitable for use herein are starches from high amylose corn hybrids which were developed in order to provide starches of high amylose content and have been available commercially since about 1963. Generally such modified starches may contain up to 20 wt. % of organic chemical modifying agent.

The starch enhances the rate of dissolution of the poly (vinyl alcohol) in water. The starch further serves as a plasticizer to improve the processibility of the fibers into fibrous bats.

The composition used herein generally will contain 0.5 to 5 parts, and preferably 1 to 3 parts, per 100 parts total composition of a processing aid. Such processing aids include lubricants, plasticizers, mold release agents, etc.

Lubricants include, but are not limited to, stearates of aluminum, calcium, magnesium, and tin, as well as the free acid, and magnesium silicate, silicones and substances, which, for purposes of the present invention, function in like manner.

Plasticizers include water, urea, and low molecular weight poly(alkylene oxides), such as poly(ethylene ether) glycols, poly(propylene ether) glycols, organic plasticizers of low molecular weight, such as glycerol, pentaerythritol, glycerol monoacetate, diacetate, or triacetate; propylene glycol; sorbitol; sodium diethylsulfosuccinate; triethyl citrate; tributyl citrate; and other substances which function in like manner.

The filters of the present invention are installed in a conventional mounting apparatus as presently used to support present day conventional filters. However, instead of being discarded with the concomitant environmental pollution and fire hazards, they are treated to remove and recover the entrained paint solids and dissolve the filter medium in water and biodegraded by a conventional waste water treatment process such as the activated sludge process.

In a preferred embodiment, the filter medium used in the present invention is formed from fibers of an intimate blend of processing aid, starch and poly(vinyl alcohol). Generally the blend will comprise 60 to 100 parts, and preferably 80 to 98 parts poly(vinyl alcohol); 0.5 to 5 parts processing aid; and 40 to 0 parts, and preferably 20 to 2 parts starch.

The poly(vinyl alcohol), processing aid and starch should be uniformly, thoroughly blended. This is readily accomplished by feeding a blend of the starch and poly(vinyl alcohol) to a twin screw extruder or a single screw extruder fitted with a mixing torpedo when extruding the filaments or fibers used to form the fibrous bat of filter material.

Generally the bat of fibrous material used to form the filters of this embodiment is from $\frac{1}{16}$ to 3.0 inches ($1.59 \times 10^{-3}$ to $7.62 \times 10^{-2}$ m) in thickness, which is the thickness range of bats presently in use. Generally the bat of fibrous material will have an apparent density of from 0.005 to 0.5 g per cubic meter with from 0.01 to 0.1 g per cubic meter being the preferred range. Bats having an apparent density of greater than 0.1 g per cubic meter and especially of greater than 0.5 g per cubic meter have an undesirably high resistance to flow therethrough. Bats having an apparent density of less than 0.01 g per cubic meter and especially those having an apparent density of less than 0.005 g per cubic meter tend to remove less than the desired level of paint particulates.

Generally the fibers or filaments used to form the filter bats of the present invention should be from 1.5 to 50 denier and preferably from 5 to 20 denier. These are the desired fiber sizes to provide the desired combination of physical properties and surface area. Fibers smaller than 5 denier and especially smaller than 1.5 denier tend to be undesirably weak and limp and thus difficult to spread into uniform bats. Fibers courser than 20 denier and especially greater than 50 denier tend to be too stiff to spread out into uniform bats.

In an alternative embodiment, the filter medium is formed in a baffle arrangement (see Figs.). The filter elements used in this embodiment are formed from an intimate blend of starch and poly(vinyl alcohol). Generally, the blend will comprise 30 to 100 parts by weight, and preferably 30 to 60 parts by weight poly(vinyl alcohol); and 70 to 0 parts by weight, and preferably 30 to 60 parts by weight of starch.

The poly(vinyl alcohol), processing aid and starch should be uniformly, thoroughly blended. This is readily accomplished by feeding a mixture of the starch and poly(vinyl alcohol) to a twin screw extruder or a single screw extruder fitted with a mixing torpedo when extruding the sheets used to form the filter elements of the baffle arranged embodiment.

Generally, the sheets used to form the filter elements of this embodiment are from 5 to 50 mils ($12.7 \times 10^{-5}$ to $12.7 \times 10^{-4}$ m) and preferably 15 to 30 mils ($3.8 \times 10^{-4}$ to $7.6 \times 10^{-4}$ m) in thickness. The filter elements are thermoformed to have raised surface areas, and are foraminous so that, when stacked, provide a tortuous air flow path through the assembled stack of filter elements. In a preferred aspect of the invention, the filter elements are shaped such that by rotating individual filter elements 90 degrees with respect to adjacent filter elements, a tortuous gas flow path through a stack of identical filter elements. Generally, the filter elements are removed one at a time from the upstream end of the stack and a replacement added one at a time to the downstream end of the stack (see Figs.).

In a final contemplated embodiment, the filter is formed as a fixed bed. For example, pellets of the starch/polymer material are placed in position between two screens whereby the solid and liquid airborne material can be impinged and retained therein. In the aforementioned embodiments, the pelleted starch/polymer material is extruded into a fiber or sheet. In this embodiment, the pellets are merely placed in between two screens, and are not extruded.

In operation, the filter medium is placed in a location or room where particles, such as paint, become airborne and need to be filtered out. Once the filter medium has collected the desired amount of paint solids, it is removed and placed in an aqueous bath. Generally the bath is maintained at 10° to 50° C. for a time sufficient to dissolve the blend of starch and poly(vinyl alcohol) which usually is a matter of 1 to 5 minutes. The paint solids form a separate phase from the resulting aqueous solution of poly(vinyl alcohol) and starch. The solids settle to the bottom of the container holding the aqueous solution of poly(vinyl alcohol) and starch, and the solution separated therefrom by decantation. Generally, the paint solids can be reformulated into new batches of paint. However, if unsuited for reformulation into new paint, the recovered paint solids can readily be disposed of, such as by incineration. The dissolved poly(vinyl alcohol) and starch can readily be disposed of in a conventional waste water disposal process, such as he well known activated sludge process generally used by municipal waste water reatment units.

EXAMPLES

Example 1

Commercially available 12 denier fibers formed from 15 wt. % gelatinized corn starch, 83 wt. % poly(vinyl alcohol) having a number average molecular weight of about 50,000 which is 87–89% hydrolyzed and 2 wt. % of an extrusion aid comprising talc and calcium stearate are pulled from a bail and laid down in a 24" (61 cm) by 24" (61 cm) form on a conveyor. The fiber is spread out using metal "fingers" or grabbers and evenly distributed throughout the form. Once the fiber is spread, a 30 wt. % aqueous solution of poly(vinyl acetate) is sprayed on the fiber. The poly(vinyl acetate) acts as an adhesive to bind the fiber forming the bat. The bat is run between a pair of nip rolls to reduce its thickness 8 fold. The final bat has a density of 0.024 g/m$^3$ and a poly(vinyl acetate) loading of 3 wt. % and a thickness of $\frac{1}{8}$ inch ($3.175 \times 10^{-3}$ m).

A plurality of 24 by 24 inch framed filters are tested in conventional paint spray booths using volatile solvent based paints. After receiving a loading of paint solids during use, the filters are removed and placed in a container of water at 20° C. After 2 minutes, the fiber material is dissolved and the paint solids are on the bottom of the container. The water solution is sent to a waste water treatment facility using the activated sludge process, and the poly(vinyl alcohol) and starch degraded. The paint solids are recovered and sent for reformulation into paint.

Example 2

Molding pellets formed from a blend of 45 parts by weight gelatinized corn starch, 50 parts by weight poly(vinyl alcohol) having a number average molecular weight of about 50,000 which is 87–89% hydrolyzed and 5 parts of a conventional processing aid and comprising calcium stearate and talc, are fed to a single screw extruder.

The blend is extruded through a slit die having 24 in.($6.1 \times 10^{-2}$ m) wide, 25 mils ($6.35 \times 10^5$ m) in thickness. The temperature profile of the extruder is: feed throat 75° F. (21° C.); feed section 280° F. (227° C.); compression section 300° F. (149° C.); metering section, adapter section and die section 275° F. (135° C.) The extrudate is taken off from the extruder die by means of nip rolls to provide a sheet 20 mils (0.5 mm) thick and 24" (0.61 m) wide, which is air cooled and rolled up.

The extruded sheet, prepared as described above is cut into pieces measuring 24" (0.61 m) square. An individual sheet piece is placed on a thermoform mold. A preheat cycle of about 25 seconds is used to heat the material to approximately 225° F. (107° C.). Once the piece is heated, the material is placed on the mold. The lid is compressed and a vacuum is used to pull down the sheet into the mold. The mold is compressed for about 5 seconds, after which time the lid is removed and the vacuum formed sheet removed from the mold. Slots are cut into the vacuum formed sheet and it is trimmed to measure 19¼" (0.49 m) by 19¼" (0.49 m). The final vacuum formed sheet has the structure shown in the drawings.

Twenty of the vacuum formed sheets are stacked in a plenum (with each vacuum formed sheet rotated 90° from the adjacent sheets) to form a filter providing a tortuous gas flow therethrough. The filter is used to filter the exit gas from a commercial spray paint booth, wherein a volatile solvent based paint system is used to spray paint a succession of objects. The upstream vacuum formed sheets are removed when filled and replaced with more sheets at the downstream end of the plenum. The paint solids laden vacuum formed sheets are placed in a container of water at 20° C. After 4 minutes, the material which formed the sheets is dissolved and the paint solids are on the bottom of the container. The water solution is sent to a waste water treatment facility using the activated sludge process. The paint solids are recovered and sent for reformulation into paint.

What is claimed is:

1. A method for separating liquid and solid water-insoluble particles entrained in a flowing stream of gas by impinging and retaining those particles on the surface of a solid filter medium, the method comprising:

(a) utilizing as a material for the filter medium a composition comprising a solid solution of a starch and a biodegradable, water-soluble synthetic polymer;

(b) placing the filter medium in water maintained at a temperature above the solubility temperature of the synthetic polymer to effect formation of a liquid aqueous solution of the biodegradable polymer and the starch;

(c) separating the water-insoluble components of the retained particles from the aqueous solution.

2. The method of claim 1 wherein the biodegradable, water-soluble synthetic polymer is poly(vinyl alcohol) having a number average molecular weight of 10,000 to 250,000.

3. The method of claim 1 further comprising the step of:

(d) biodegrading the solution of dissolved components from the filter medium.

4. The method of claim 1 wherein the starch is a gelatinized starch.

5. The method of claim 1 wherein the filter medium further comprises a bat of fibrous material from 1/16 to 3.0 inches in thickness, having an apparent density of 0.0005 to 0.5 g per cubic meter, formed of fibers having a denier of 1.5 to 50, which fibers are formed from an intimate blend consisting essentially of 0 to 40 parts by weight starch and 100 to 60 parts by weight poly(vinyl alcohol) having a number average molecular weight of from 10,000 to 250,000, and a degree of hydrolysis of 75 to 100%.

6. The method of claim 5 wherein from 2 to 20 parts by weight starch are present per 100 parts by weight filter composition.

7. The method of claim 6 wherein the fibers have a denier of 5 to 20.

8. The method of claim 7 wherein the poly(vinyl alcohol) is about 87–89 percent hydrolyzed.

9. The method of claim 1 wherein the filter medium further comprises a plurality of foraminous filter sheets which are from 5 to 50 mils ($12.7 \times 10^{-5}$ to $12.7 \times 10^{-4}$) thick and, which function as baffles to provide a tortuous gas flow path through said sheets, which sheets are formed from an intimate blend consisting essentially of 30 to 100 parts by weight poly(vinyl alcohol) having a molecular weight of 10,000 to 250,000, and has a degree of hydrolysis of 75 to 100% and 0 to 70 parts by weight starch.

10. The method of claim 9 wherein from 30 to 60 parts by weight starch are present per 100 parts by weight filter composition.

11. The method of claim 10 wherein the poly(vinyl alcohol) in the filter sheets is about 87–89% hydrolyzed.

12. A filter medium adapted to impinge and retain liquid and solid water-insoluble particles entrained in a flowing stream of gas, the filter medium comprising a solid solution of a starch and a biodegradable, water-soluble synthetic polymer.

13. The filter medium of claim 12 wherein the filter medium further comprises a bat of fibrous material from 1/16 to 3.0 inches in thickness, having an apparent density of 0.0005 to 0.5 g per cubic meter, formed of fibers having a denier of 1.5 to 50, which fibers are formed from an intimate blend consisting essentially of 0 to 40 parts by weight starch and 100 to 60 parts by weight poly(vinyl alcohol) having a number average molecular weight of from 10,000 to 250,000, and a degree of hydrolysis of 75 to 100%.

14. The filter medium of claim 13 wherein from 2 to 20 parts by weight starch are present per 100 parts by weight filter composition.

15. The filter medium of claim 14 wherein the fibers have a denier of 5 to 20.

16. The filter medium of claim 15 wherein the poly(vinyl alcohol) is about 87–89 percent hydrolyzed.

17. The filter medium of claim 12 wherein the filter medium further comprises a plurality of foraminous filter sheets which are from 5 to 50 mils ($12.7 \times 10^{-5}$ to $12.7 \times 10^{-4}$) thick and, which function as baffles to provide a tortuous gas flow path through said sheets, which sheets are formed from an intimate blend consisting essentially of 30 to 100 parts by weight poly(vinyl alcohol) having a molecular weight of 10,000 to 250,000, and has a degree of hydrolysis of 75 to 100% and 0 to 30 parts by weight starch.

18. The filter medium of claim 17 wherein from 30 to 60 parts by weight starch are present per 100 parts by weight filter composition.

19. The filter medium of claim 18 wherein the filter sheets have a thickness of 15 to 30 mils.

20. The filter medium of claim 19 wherein the poly(vinyl alcohol) in the filter sheets is about 87–89% hydrolyzed.

* * * * *